United States Patent
Noll

[19]
[11] Patent Number: 5,988,046
[45] Date of Patent: Nov. 23, 1999

[54] DEEP FRYING AND SERVING IMPLEMENT

[76] Inventor: Philip A. Noll, 2604 SW. 34th Ave., Fort Lauderadale, Fla. 33312

[21] Appl. No.: 09/019,283

[22] Filed: Feb. 5, 1998

[51] Int. Cl.$^6$ .............................. A47J 37/00; A47J 37/12
[52] U.S. Cl. ................................ 99/340; 99/403; 99/410; 99/415; 99/418; 99/426; 99/449; 99/450; 211/181.1
[58] Field of Search ................ 99/467, 339, 419–421 V, 99/349, 403, 426, 646 R, 532, 410–418, 442, 448; 452/195, 196, 132; 426/523, 420; 165/185; 211/181.1

[56] References Cited

U.S. PATENT DOCUMENTS

| | | | |
|---|---|---|---|
| 692,833 | 1/1902 | Williamson | 99/426 X |
| 1,890,907 | 12/1932 | Hoover | 99/419 X |
| 2,052,505 | 8/1936 | Vetrosky | 99/426 X |
| 2,111,456 | 3/1938 | Markle, Jr. | 99/419 |
| 2,584,295 | 2/1952 | Sanzenbacher | 99/426 X |
| 2,763,198 | 9/1956 | Williams | 99/339 |
| 3,379,118 | 4/1968 | Perez | 99/419 |
| 4,542,684 | 9/1985 | Centrell | 211/181.1 |
| 4,612,851 | 9/1986 | McManus | 99/441 X |
| 4,745,968 | 5/1988 | Demos | 426/523 X |
| 4,924,768 | 5/1990 | Jay | 99/448 X |
| 5,842,689 | 12/1998 | Hunter | 99/419 X |

*Primary Examiner*—Timothy Simone

[57] ABSTRACT

A new deep frying and serving implement for efficiently deep frying foods and being utilized as a serving tray. The inventive device includes a planar platter portion having a generally rectangular configuration defined by opposed long side walls and opposed short end walls. The platter portion includes an upper surface and a lower surface. A plurality of stainless steel rods extend outwardly of the lower surface of the planar platter portion. The plurality of stainless steel rods each have pointed free ends and spiraled threads extending upwardly from the pointed free ends.

7 Claims, 2 Drawing Sheets

DEEP FRYING AND SERVING IMPLEMENT

BACKGROUND OF THE INVENTION

1. Field of the Invention

The present invention relates to cooking implements and more particularly pertains to a new deep frying and serving implement for efficiently deep frying foods and being utilized as a serving tray.

2. Description of the Prior Art

The use of cooking implements is known in the prior art. More specifically, cooking implements heretofore devised and utilized are known to consist basically of familiar, expected and obvious structural configurations, notwithstanding the myriad of designs encompassed by the crowded prior art which have been developed for the fulfillment of countless objectives and requirements.

Known prior art cooking implements include U.S. Pat. No. 5,174,196 to Cheatham; U.S. Pat. No. 4,924,768 to Jay; U.S. Pat. No. 3,956,979 to Coroneos; U.S. Pat. No. 5,377,582 to Nersesian; U.S. Pat. No. 5,129,451 to Moir et al.; and U.S. Pat. No. Des. 261,092 to Menard.

While these devices fulfill their respective, particular objectives and requirements, the aforementioned patents do not disclose a new deep frying and serving implement. The inventive device includes a planar platter portion having a generally rectangular configuration defined by opposed long side walls and opposed short end walls. The platter portion includes an upper surface and a lower surface. A plurality of stainless steel rods extend outwardly of the lower surface of the planar platter portion. The plurality of stainless steel rods each have pointed free ends and spiraled threads extending upwardly from the pointed free ends.

In these respects, the deep frying and serving implement according to the present invention substantially departs from the conventional concepts and designs of the prior art, and in so doing provides an apparatus primarily developed for the purpose of efficiently deep frying foods and being utilized as a serving tray.

SUMMARY OF THE INVENTION

In view of the foregoing disadvantages inherent in the known types of cooking implements now present in the prior art, the present invention provides a new deep frying and serving implement construction wherein the same can be utilized for efficiently deep frying foods and being utilized as a serving tray.

The general purpose of the present invention, which will be described subsequently in greater detail, is to provide a new deep frying and serving implement apparatus and method which has many of the advantages of the cooking implements mentioned heretofore and many novel features that result in a new deep frying and serving implement which is not anticipated, rendered obvious, suggested, or even implied by any of the prior art cooking implements, either alone or in any combination thereof.

To attain this, the present invention generally comprises a planar platter portion having a generally rectangular configuration defined by opposed long side walls and opposed short end walls. The platter portion includes an upper surface and a lower surface. The short end walls each have a handle extending outwardly therefrom. A plurality of stainless steel rods extend outwardly of the lower surface of the planar platter portion. The plurality of stainless steel rods each have pointed free ends and spiraled threads extending upwardly from the pointed free ends. The rods are arranged in an outer circular pattern and in an inner cross pattern.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new deep frying and serving implement apparatus and method which has many of the advantages of the cooking implements mentioned heretofore and many novel features that result in a new deep frying and serving implement which is not anticipated, rendered obvious, suggested, or even implied by any of the prior art cooking implements, either alone or in any combination thereof.

It is another object of the present invention to provide a new deep frying and serving implement which may be easily and efficiently manufactured and marketed.

It is a further object of the present invention to provide a new deep frying and serving implement which is of a durable and reliable construction.

An even further object of the present invention is to provide a new deep frying and serving implement which is susceptible of a low cost of manufacture with regard to both materials and labor, and which accordingly is then susceptible of low prices of sale to the consuming public, thereby making such deep frying and serving implement economically available to the buying public.

Still yet another object of the present invention is to provide a new deep frying and serving implement which provides in the apparatuses and methods of the prior art some of the advantages thereof, while simultaneously overcoming some of the disadvantages normally associated therewith.

Still another object of the present invention is to provide a new deep frying and serving implement for efficiently deep frying foods and utilized as a serving tray.

Yet another object of the present invention is to provide a new deep frying and serving implement which includes a planar platter portion having a generally rectangular configuration defined by opposed long side walls and opposed short end walls. The platter portion includes an upper surface and a lower surface. A plurality of stainless steel rods extend outwardly of the lower surface of the planar platter portion. The plurality of stainless steel rods each have pointed free ends and spiraled threads extending upwardly from the pointed free ends.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
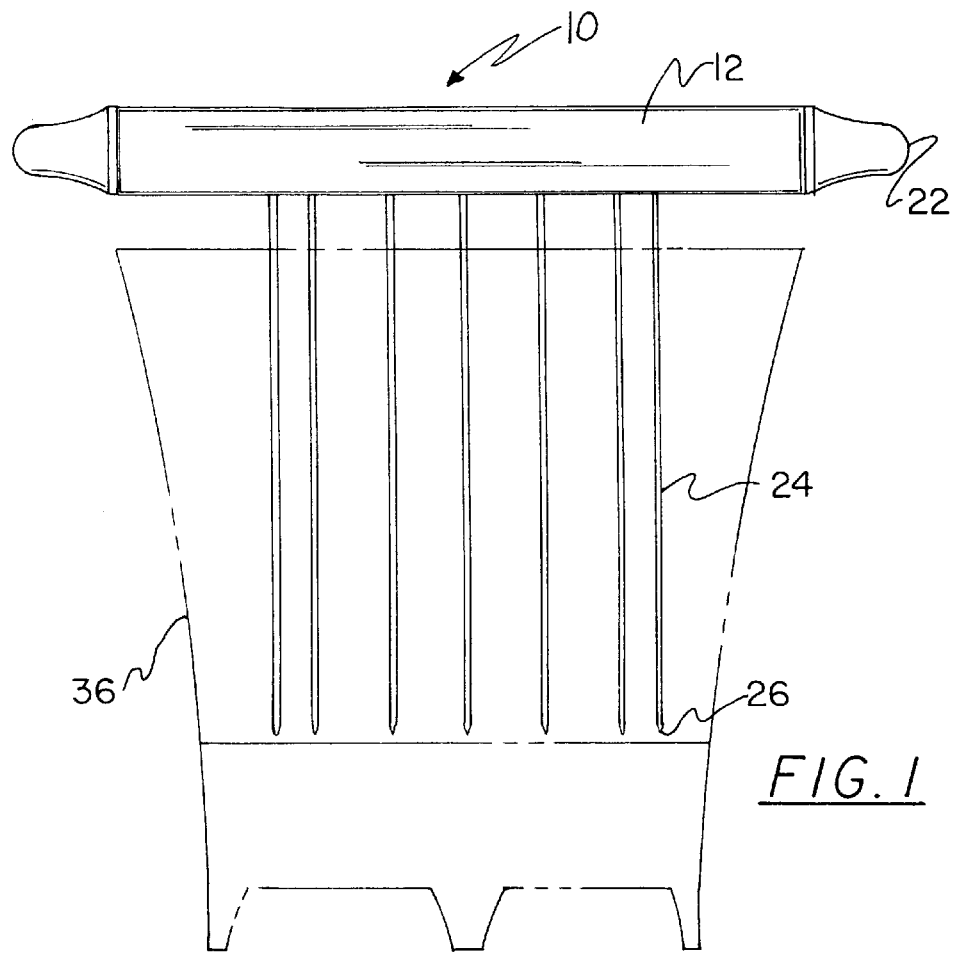
FIG. 1 is a front view of a new deep frying and serving implement according to the present invention.
Figure 2:
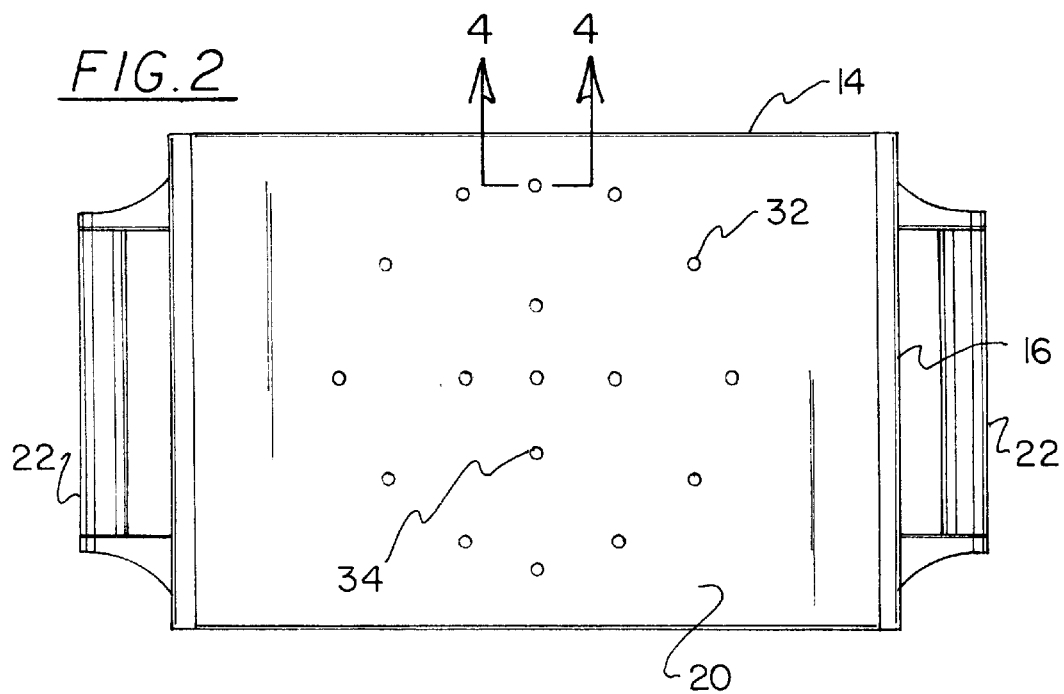
FIG. 2 is a bottom plan view of the present invention.
Figure 3:
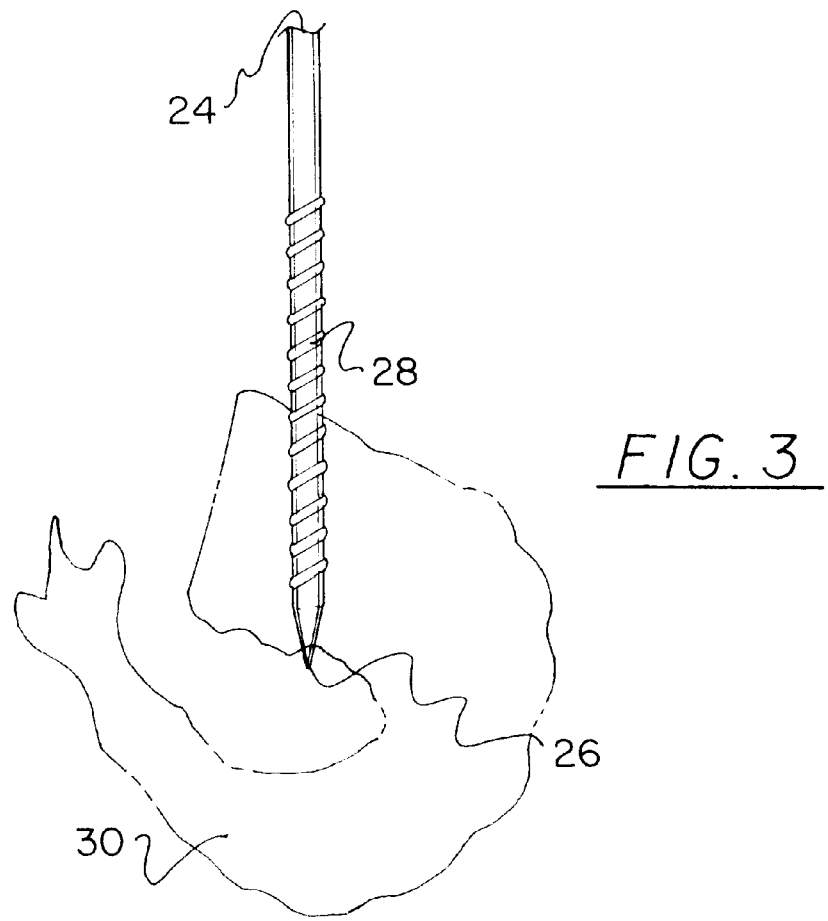
FIG. 3 is a detailed view of a free end of a rod of the present invention illustrated in use.
Figure 4:
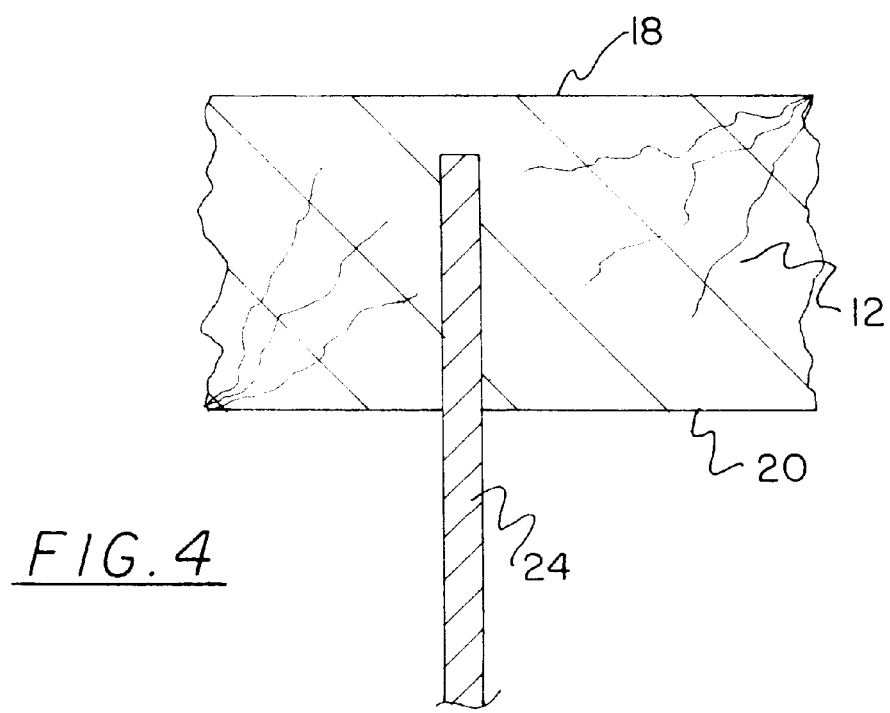
FIG. 4 is a cross-sectional view of the present invention as taken along line 4—4 of FIG. 2.

With reference now to the drawings, and in particular to FIGS. 1 through 4 thereof, a new deep frying and serving implement embodying the principles and concepts of the present invention and generally designated by the reference numeral 10 will be described.

As best illustrated in FIGS. 1 through 4, the deep frying and serving implement 10 comprises a planar platter portion 12 having a generally rectangular configuration defined by opposed long side walls 14 and opposed short end walls 16. The platter portion 12 includes an upper surface 18 and a lower surface 20. The short end walls 16 each have a handle 22 extending outwardly therefrom. In the preferred embodiment, the platter portion 12 is fabricated of cypress wood.

A plurality of stainless steel rods 24 extend outwardly of the lower surface 20 of the planar platter portion 12. The plurality of stainless steel rods 24 each have pointed free ends 26 and spiraled threads 28 extending upwardly from the pointed free ends 26. The pointed free ends 26 penetrate the item of food 30 to be fried while the spiraled threads 28 prevent the item of food 30 from falling off of the rod 24 during the cooking process. The rods 24 are arranged in an outer circular pattern 32 and in an inner cross pattern 34. The rods 24 preferably measure seven inches in length.

In use, the user would simply insert pieces of shrimp or other food items 30 onto the rods 24 and place the present invention into a standard deep fryer 36 filled with hot oil. The present invention would quickly and evenly cook the shrimp or other food items 30. The present invention could then be removed, placed upside down, and used as a serving tray for the cooked shrimp or other food items 30. The stainless steel rods 24 would cook the inside of the shrimp or other food items 30 while the hot oil cooks the outside of the shrimp or other food items 30.

Alternately, the device 10 could be used in association with a pot of boiling water whereby corn-on-the-cob and the like are placed on the rods 24 and the then submerge the corn into the boiling water to cook. Once cooked, the platter portion 12 could be used to remove the corn from the water.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A deep frying and serving implement for efficiently deep frying foods and being utilized as a serving tray comprising, in combination:

a planar platter portion having a generally rectangular configuration defined by opposed long side walls and opposed short end walls, the platter portion including an upper surface and a lower surface, the short end walls each having a handle extending outwardly therefrom; and a plurality of stainless steel rods extending outwardly of the lower surface of the planar platter portion, the plurality of stainless steel rods each having pointed free ends and spiraled threads extending upwardly from the pointed free ends, the rods being arranged in an outer circular pattern and in an inner cross pattern.

2. A deep frying and serving implement for efficiently deep frying foods and being utilized as a serving tray comprising, in combination:

a planar platter portion having a generally rectangular configuration defined by opposed long side walls and opposed short end walls, the platter portion including an upper surface and a lower surface;

a plurality of stainless steel rods extending outwardly of the lower surface of the planar platter portion, the plurality of stainless steel rods each having pointed free ends; and wherein the plurality of stainless steel rods each have spiraled threads extending upwardly from the pointed free ends.

3. The deep frying and serving implement as set forth in claim 2 wherein the short end walls of the planar platter portion each have a handle extending outwardly therefrom.

4. The deep frying and serving implement as set forth in claim 2 wherein the rods are arranged in an outer circular pattern and in an inner cross pattern.

5. A deep frying and serving implement for efficiently deep frying foods and being utilized as a serving tray comprising, in combination:

a planar platter portion having an upper surface and a lower surface;

a plurality of rods extending outwardly of the lower surface of the planar platter portion, the plurality of rods each having pointed free ends and spiraled threads extending upwardly from the pointed free ends; and wherein the plurality of stainless steel rods each have spiraled threads extending upwardly from the pointed free ends.

6. The deep frying and serving implement as set forth in claim 5 wherein the short end walls of the planar platter portion each have a handle extending outwardly therefrom.

7. The deep frying and serving implement as a set forth in claim 5 wherein the rods are arranged in an outer circular pattern and in an inner cross pattern.

\* \* \* \* \*

UNITED STATES PATENT AND TRADEMARK OFFICE
CERTIFICATE OF CORRECTION

PATENT NO. : 5,988,046
DATED : Nov. 23, 1999
INVENTOR(S) : Philip A. Noll

It is certified that error appears in the above-identified patent and that said Letters Patent is hereby corrected as shown below:

On title page, item [76], line 4, "2604 SW. 34$^{th}$ Ave., Fort Lauderadale, Fla. 33312" should read -- 6255 S. Wildermuth Point, Homosassa, Fl. 34446-3346--.

Signed and Sealed this

Third Day of April, 2001

*Attest:*

NICHOLAS P. GODICI

*Attesting Officer*  *Acting Director of the United States Patent and Trademark Office*